US012306565B2

(12) United States Patent
Kimura et al.

(10) Patent No.: US 12,306,565 B2
(45) Date of Patent: May 20, 2025

(54) IMAGE FORMING APPARATUS

(71) Applicant: KYOCERA Document Solutions Inc., Osaka (JP)

(72) Inventors: Ryosuke Kimura, Osaka (JP); Takahisa Nakaue, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 18/604,895

(22) Filed: Mar. 14, 2024

(65) Prior Publication Data

US 2024/0319650 A1 Sep. 26, 2024

(30) Foreign Application Priority Data

Mar. 24, 2023 (JP) ................................ 2023-048279

(51) Int. Cl.
*G03G 15/00* (2006.01)
*G03G 15/06* (2006.01)
*G03G 15/16* (2006.01)

(52) U.S. Cl.
CPC ....... *G03G 15/5054* (2013.01); *G03G 15/065* (2013.01); *G03G 15/1605* (2013.01)

(58) Field of Classification Search
CPC ............ G03G 15/065; G03G 15/1605; G03G 15/5054
USPC ........................................ 399/44, 53, 55, 56
See application file for complete search history.

(56) References Cited

U.S. PATENT DOCUMENTS

2003/0219266 A1 11/2003 Itagaki et al. .................. 399/38

FOREIGN PATENT DOCUMENTS

JP 2003-345075 A 12/2003
JP 20211086062 * 6/2021

* cited by examiner

*Primary Examiner* — Hoan H Tran
(74) *Attorney, Agent, or Firm* — Stein IP, LLC

(57) ABSTRACT

An image forming apparatus includes an image forming unit, a transfer member, a density detection device, and a control unit. The image forming unit includes an image carrier, a charging device, an exposing device, and a developing device. The control unit is capable of executing a calibration mode to correct density of a toner image. When the calibration mode is executed, a datum image is formed by the developing device, a developing voltage is adjusted on the basis of density of the datum image detected by the density detection device, and a transfer voltage is adjusted on the basis of the adjusted developing voltage.

3 Claims, 5 Drawing Sheets

IMAGE FORMING APPARATUS

INCORPORATION BY REFERENCE

This application is based upon and claims the benefit of priority from the corresponding Japanese Patent Application No. 2023-48279 filed Mar. 24, 2023, the entire contents of which are hereby incorporated by reference.

BACKGROUND

The present disclosure relates to an image forming apparatus such as a copier, a printer, a facsimile, or a multifunction peripheral of them, equipped with an image carrier.

A conventional image forming apparatus is disclosed in Patent Document 1. This image forming apparatus is equipped with an image forming unit, a density detection device, and a transfer member. The image forming unit includes an image carrier, a charging device, an exposing device, and a developing device.

The image carrier has a photosensitive layer formed on a surface thereof. The charging device charges the image carrier. The exposing device exposes the image carrier charged by the charging device, so as to form an electrostatic latent image. The developing device includes a developer carrier, applies the developer carrier with a predetermined developing voltage, and allows toner to adhere to the electrostatic latent image formed on the image carrier, so as to form a toner image. The developer carrier is disposed to face the image carrier and carries two-component developer that contains magnetic carrier and toner.

The transfer member is disposed to face the image carrier, and is applied with a predetermined transfer voltage, so as to transfer the toner image formed on the image carrier onto a transfer target medium. The density detection device detects density of the toner image formed by the developing device.

A surface potential of the electrostatic latent image formed on the image carrier before development and a surface potential of the toner image after development are measured. On the basis of the measured surface potentials before and after development and the toner image density detected by the density detection device, a toner charge amount is estimated. On the basis of the estimated toner charge amount, the transfer voltage is adjusted. In this way, it is possible to prevent occurrence of a defective transfer due to insufficient or excessive transfer voltage.

When the conventional technique is adopted, there is a problem that it is necessary to use a surface potential sensor for measuring the surface potentials of the electrostatic latent image and the toner image formed on the image carrier, and this may cause an increase in cost.

SUMMARY

An image forming apparatus according to an aspect of the present disclosure includes an image forming unit, a transfer member, a density detection device, and a control unit. The image forming unit includes an image carrier, a charging device, an exposing device, and a developing device. The image carrier has a photosensitive layer formed on a surface thereof. The charging device charges the image carrier. The exposing device exposes the image carrier charged by the charging device, so as to form an electrostatic latent image. The developing device has a developer carrier, and applies the developer carrier with a predetermined developing voltage, so as to allow toner to adhere to the electrostatic latent image formed on the image carrier to form a toner image. The developer carrier is disposed to face the image carrier and carries two-component developer containing magnetic carrier and toner. The transfer member is disposed to face the image carrier, and is applied with a predetermined transfer voltage so as to transfer the toner image formed on the image carrier onto a transfer target medium. The density detection device detects density of the toner image formed by the developing device. The control unit controls the image forming unit, the transfer member, and the density detection device. The control unit is capable of executing a calibration mode to correct density of the toner image. When executing the calibration mode, a datum image is formed by the developing device, the developing voltage is adjusted on the basis of density of the datum image detected by the density detection device, and the transfer voltage is adjusted on the basis of the adjusted developing voltage.

Other objects of the present disclosure and specific advantages obtained by the present disclosure will become more apparent from the description of the embodiment given below.

DETAILED DESCRIPTION

Figure 1:
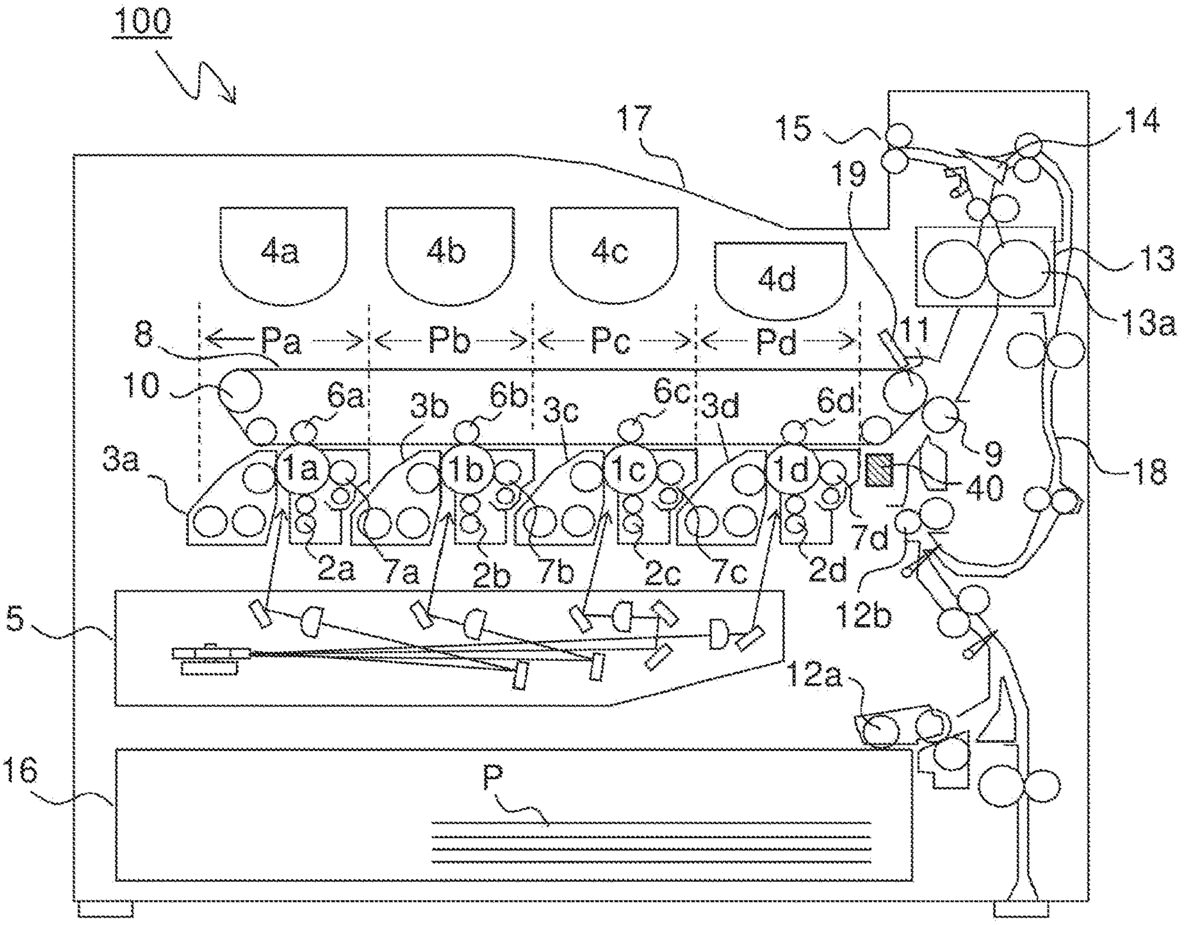
FIG. 1 is a cross-sectional side view illustrating an internal structure of an image forming apparatus 100 according to one embodiment of the present disclosure.

Hereinafter, an embodiment of the present disclosure is described with reference to the drawings. FIG. 1 is a cross-sectional view illustrating an internal structure of an image forming apparatus 100 according to one embodiment of the present disclosure.

The image forming apparatus 100 includes image forming units Pa to Pd, primary transfer rollers (transfer members) 6*a* to 6*d*, an image density sensor (density detection device) 40, and a main control unit (control unit) 80.

The four image forming units Pa, Pb, Pc, and Pd are disposed in a main body of the image forming apparatus 100 (a color printer as an example), in order from an upstream side in a conveying direction (from the left side in FIG. 1). The image forming units Pa to Pd are disposed corresponding to four different color images (cyan, magenta, yellow, and black images), and they respectively form cyan, magenta, yellow, and black images sequentially, by steps of charging, exposing, developing, and transferring.

The image forming units Pa to Pd include photosensitive drums (image carriers) 1*a* to 1*d*, charging devices 2*a* to 2*d*, an exposing device 5, and developing devices 3*a* to 3*d*. The photosensitive drums (image carriers) 1*a*, 1*b*, 1*c*, and 1*d*, which carry visual images (toner images) of the individual colors, are respectively disposed to the image forming units Pa to Pd, and further an intermediate transfer belt (a transfer target medium) 8, which is rotated in a counterclockwise direction in FIG. 1 by a drive means (not shown), is disposed adjacent to the image forming units Pa to Pd.

The primary transfer rollers (transfer members) 6*a* to 6*d* are disposed to face the photosensitive drums (image carriers) 1*a* to 1*d*, respectively, and are applied with predetermined transfer voltages, so that the visual images (toner images) of the individual colors formed respectively on the photosensitive drums (image carriers) 1*a* to 1*d* are transferred onto the intermediate transfer belt (transfer target medium) 8. In this way, the toner images formed respectively on the photosensitive drums 1*a* to 1*d* are sequentially and primarily transferred and overlaid onto the intermediate transfer belt 8, which moves while contacting with the photosensitive drums 1*a* to 1*d*.

After that, the toner images that are primarily transferred onto the intermediate transfer belt 8 are secondarily transferred by a secondary transfer roller 9, onto a transfer paper sheet P as an example of a recording medium. Furthermore, the transfer paper sheet P with the secondarily transferred toner images undergoes fixing of the toner images in a fixing unit 13, and after that it is discharged from the main body of the image forming apparatus 100. The photosensitive drums 1*a* to 1*d* are rotated in a clockwise direction in FIG. 1, while image forming processes are performed on the photosensitive drums 1*a* to 1*d*.

The transfer paper sheets P, onto which the toner images are to be secondarily transferred, are stored in a paper sheet cassette 16 disposed in a lower part of the main body of the image forming apparatus 100. The transfer paper sheet P is conveyed to a nip part between the secondary transfer roller 9 and a drive roller 11 of the intermediate transfer belt 8, via a paper feed roller 12*a* and a registration roller pair 12*b*. A dielectric resin sheet is used for the intermediate transfer belt 8, and a seamless belt is mainly used for the same. In addition, a blade-like belt cleaner 19, which is used for removing toner and the like remaining on a surface of the intermediate transfer belt 8, is disposed on a downstream side of the secondary transfer roller 9.

Next, the image forming units Pa to Pd are described. Around and below the photosensitive drums 1*a* to 1*d* disposed in a rotatable manner, there are disposed charging devices 2*a*, 2*b*, 2*c*, and 2*d* that charge the photosensitive drums 1*a* to 1*d*, respectively, the exposing device 5 that exposes the photosensitive drums 1*a* to 1*d* with image information, developing devices 3*a*, 3*b*, 3*c*, and 3*d* that form toner images on the photosensitive drums 1*a* to 1*d*, respectively, and cleaning devices 7*a*, 7*b*, 7*c*, and 7*d* that remove developer (toner) and the like remaining on the photosensitive drums 1*a* to 1*d*, respectively.

In other words, the charging devices 2*a* to 2*d* charge the photosensitive drums (image carriers) 1*a* to 1*d*, respectively. The exposing device 5 exposes the photosensitive drums (image carriers) 1*a* to 1*d* charged by the charging devices 2*a* to 2*d*, respectively, so as to form electrostatic latent images. The developing devices 3*a* to 3*d* each include a developing roller (developer carrier) 31, applies the developing roller (developer carrier) 31 with a predetermined developing voltage, and allow toner to adhere to the electrostatic latent images formed on the photosensitive drums (image carriers) 1*a* to 1*d*, respectively, so as to form toner images. The developing rollers (developer carriers) 31 are disposed to face the photosensitive drums (image carriers) 1*a* to 1*d*, respectively, and carry two-component developer that contains magnetic carrier and toner.

Specifically, when image data is input from a host device such as a personal computer, the charging devices 2*a* to 2*d* uniformly charge surfaces of the photosensitive drums 1*a* to 1*d*, respectively first. Next, the exposing device 5 emits light corresponding to the image data, and hence electrostatic latent images corresponding to the image data are formed on the photosensitive drums 1*a* to 1*d*, respectively. The developing devices 3*a* to 3*d* are filled with predetermined amounts of two-component developer containing toner of cyan, magenta, yellow, and black colors, respectively. Note that, when a ratio of the toner in the two-component developer filled in the developing device 3*a* to 3*d* decreases below a specified value, due to toner image formation described later, the developing device 3*a* to 3*d* is replenished with the toner from a toner container 4*a* to 4*d*. The toner in the developer is supplied to the photosensitive drum 1*a* to 1*d* by the developing device 3*a* to 3*d*, and adheres to the same in an electrostatic manner, and hence a toner image is formed corresponding to the electrostatic latent image formed by exposing from the exposing device 5.

Further, the primary transfer roller 6*a* to 6*d* applies an electric field of a predetermined transfer voltage to between the primary transfer roller 6*a* to 6*d* and the photosensitive drums 1*a* to 1*d*, and the cyan, magenta, yellow and black toner images on the photosensitive drums 1*a* to 1*d* are primarily transferred onto the intermediate transfer belt 8. These four color images are formed with a predetermined positional relationship for formation of a predetermined full color image. After that, as preparation for following formation of a new electrostatic latent image, the toner and the like remaining on the surfaces of the photosensitive drums 1*a* to 1*d* after the primary transfer are removed by the cleaning devices 7*a* to 7*d*, respectively.

The intermediate transfer belt 8 is wrapped around a driven roller 10 on the upstream side and the drive roller 11 on the downstream side. When the drive roller 11 is rotated by the drive motor (not shown), the intermediate transfer belt 8 starts to rotate in the counterclockwise direction, and the transfer paper sheet P is conveyed from the registration roller pair 12*b* to a nip part between the drive roller 11 and the secondary transfer roller 9 disposed adjacent thereto (a secondary transfer nip part) at a predetermined timing, and the full color image on the intermediate transfer belt 8 is secondarily transferred onto the transfer paper sheet P. The transfer paper sheet P with the secondarily transferred toner image is conveyed to the fixing unit 13.

The transfer paper sheet P conveyed to the fixing unit 13 is heated and pressed by a fixing roller pair 13*a*, and the toner image is fixed to a surface of the transfer paper sheet P so that a predetermined full color image is formed. The conveying direction of the transfer paper sheet P with the formed full color image is selected by a branch part 14 that branches into a plurality of directions, and the transfer paper sheet P is discharged by a discharge roller pair 15 onto a discharge tray 17 as it is (or after being sent to a double-sided conveying path 18 and after forming images on both sides).

Furthermore, the image density sensor (density detection device) 40 is disposed at a position facing the drive roller 11 via the intermediate transfer belt 8. As the image density sensor 40, an optical sensor is used, which is usually constituted of a light emission element such as an LED and a light receiving element such as a photodiode. When measuring a toner adhesion amount on the intermediate transfer belt 8, the light emission element emits measurement light to datum images formed on the intermediate transfer belt 8, and the measurement light enters the light receiving element after some of it is reflected by the toner while the other is reflected by the surface of the belt.

The reflected light from the toner and the reflected light from the surface of the belt each contain specular reflected light and diffuse reflected light. The specular reflected light and the diffuse reflected light are separated by a polarized light separation prism, and enter different light receiving elements. Each of the light receiving elements photoelectrically converts the received specular reflected light or diffuse reflected light so as to output its output signal to the main control unit 80 (see FIG. 3). Then, the density of the toner image is detected from characteristic changes of the output signals of the specular reflected light and the diffuse reflected light.

In other words, the image density sensor (density detection device) 40 detects the density of the toner image transferred onto the intermediate transfer belt (transfer target medium) 8. The density of the toner image detected by the image density sensor (density detection device) 40 is compared with a predetermined reference density, and thus a characteristic value of the developing voltage or the like is adjusted. In this way, correction (calibration) of toner density is performed for each color. Note that the calibration will be described later in detail.

Figure 2:
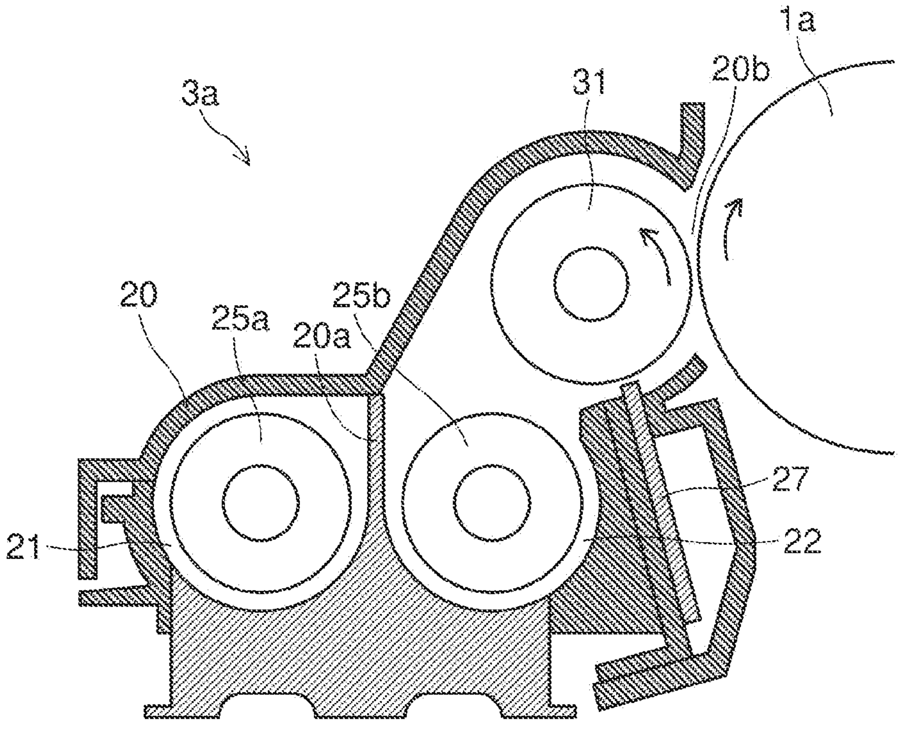
FIG. 2 is a cross-sectional side view of a developing device 3*a* mounted in the image forming apparatus 100 according to the embodiment of the present disclosure.

FIG. 2 is a cross-sectional side view of the developing device 3*a* mounted in the image forming apparatus 100. Note that in the following description, the developing device 3*a* disposed in the image forming unit Pa illustrated in FIG. 1 is exemplified, and the other developing devices 3*b* to 3*d* disposed in the image forming units Pb to Pd have the same basic structure, and hence descriptions thereof are omitted.

As illustrated in FIG. 2, the developing device 3*a* includes a developer container 20 that stores the two-component developer containing magnetic carrier and toner (hereinafter, simply referred to as developer), and the developer container 20 is divided by a partition wall 20*a* into a stirring conveying chamber 21 and a supply conveying chamber 22. The stirring conveying chamber 21 and the supply conveying chamber 22 are provided with a stirring conveying screw 25*a* and a supply conveying screw 25*b*, respectively, in a rotatable manner, for mixing, stirring, and charging the toner supplied from the toner container 4*a* (see FIG. 1) and the magnetic carrier.

Then, the developer is stirred and conveyed in an axial direction (direction perpendicular to the paper of FIG. 2) by the stirring conveying screw 25*a* and the supply conveying screw 25*b*, so as to circulate in the stirring conveying chamber 21 and the supply conveying chamber 22 through not-shown developer passages formed on both ends of the partition wall 20*a*. In other words, the stirring conveying chamber 21, the supply conveying chamber 22, and the developer passages form a circulation path for the developer in the developer container 20.

The developer container 20 extends to the upper right in FIG. 2, and the developing roller (developer carrier) 31 is disposed on the upper right side of the supply conveying screw 25*b* in the developer container 20. Further, the outer circumference surface of the developing roller 31 is partially exposed from an opening 20*b* of the developer container 20 so as to face the photosensitive drum 1*a*. The developing roller 31 rotates in the counterclockwise direction in FIG. 2.

In FIG. 2, the developing roller 31 is constituted of a cylindrical developing sleeve that rotates in the counterclockwise direction and a magnet (not shown) having a plurality of magnetic poles, which is fixed in the developing sleeve. Note that the developing sleeve has a knurled surface in this example, but it may be possible to use the developing sleeve having a surface with many recesses (dimples), or a blasted surface, or a knurled, recessed, and blasted surface, or a plated surface.

In addition, the developer container 20 is provided with a regulating blade 27 attached along a longitudinal direction of the developing roller 31 (the direction perpendicular to the paper of FIG. 2). A slight clearance (gap) is formed between the tip of the regulating blade 27 and the surface of the developing roller 31.

Figure 3:
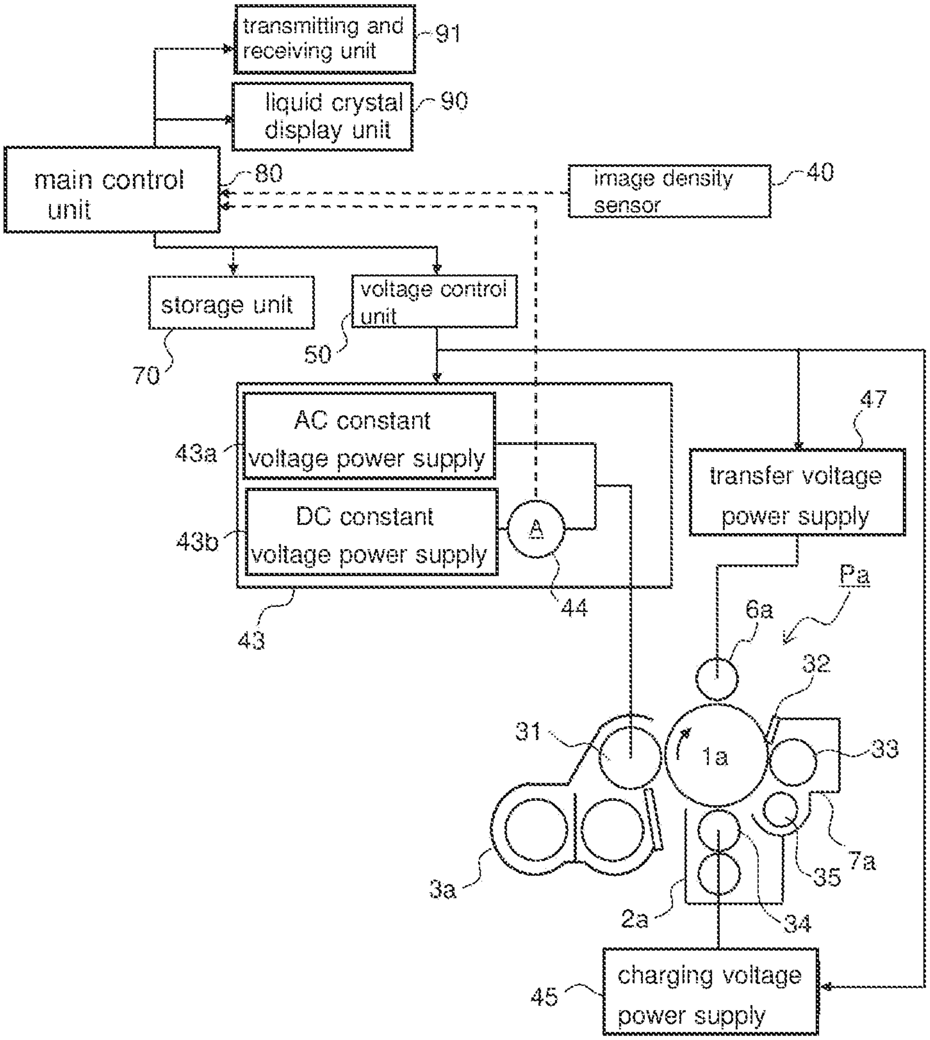
FIG. 3 is a partial enlarged view of an image forming unit Pa and its vicinity, including control paths in the developing device 3*a* of the image forming apparatus 100 according to the embodiment of the present disclosure.

The developing roller 31 is applied with the developing voltage, which is constituted of a DC voltage Vslv(DC) that is also referred to as Vdc and an AC voltage Vslv(AC), from a developing voltage power supply 43 (see FIG. 3).

FIG. 3 is a partial enlarged view of the image forming unit Pa and its vicinity, including control paths of the developing device 3*a*. In the following description, a structure of the image forming unit Pa and the control paths of the developing device 3*a* are described. The image forming units Pb to Pd each have the same structure as the image forming unit Pa, and the developing devices 3*b* to 3*d* each have the same control paths as the developing device 3*a*, and hence descriptions of them are omitted.

The developing roller 31 is connected to the developing voltage power supply 43 that generates an oscillation voltage constituted of superimposed DC and AC voltages. The developing voltage power supply 43 includes an AC constant voltage power supply 43*a* and a DC constant voltage power supply 43*b*. The AC constant voltage power supply 43*a* outputs a sine wave AC voltage generated from a low DC voltage modulated in a pulse shape using a step up transformer (not shown). The DC constant voltage power supply 43*b* outputs a DC voltage produced by rectifying the sine wave AC voltage generated from the low DC voltage modulated in a pulse shape using the step up transformer.

During image formation, the developing voltage power supply 43 outputs the developing voltage, which is constituted of superimposed DC and AC voltages, from the AC constant voltage power supply 43*a* and the DC constant voltage power supply 43*b*. A current detection unit 44 detects a DC current value flowing between the developing roller 31 and the photosensitive drum 1*a*.

A charging voltage power supply 45 applies a charging roller 34 of the charging device 2*a* with a charging voltage constituted of superimposed DC and AC voltages. The charging voltage power supply 45 has the same structure as the developing voltage power supply 43. A transfer voltage power supply 47 applies the primary transfer rollers (transfer members) 6*a* to 6*d* and the secondary transfer roller 9 (see FIG. 1) with a primary transfer voltage (transfer voltage) and a secondary transfer voltage, respectively.

The cleaning device 7*a* includes a cleaning blade 32 that removes residual toner on the surface of the photosensitive drum 1*a*, a rubbing roller 33 that removes the residual toner on the surface of the photosensitive drum 1*a* and further rubs and grinds the surface of the photosensitive drum 1*a*, and a conveyance spiral 35 that discharges the residual toner removed by the cleaning blade 32 and the rubbing roller 33 from the photosensitive drum 1*a*, to the outside of the cleaning device 7*a*.

Next, a control system of the image forming apparatus 100 is described with reference to FIG. 3. The image forming apparatus 100 includes the main control unit (control unit) 80 constituted of a CPU and the like. The main control unit 80 is connected to a storage unit 70 constituted of a ROM, a RAM, and the like. The storage unit 70 stores in advance a program for executing a normal image formation mode and a calibration mode.

On the basis of the control program and data for control stored in the storage unit 70, the main control unit 80 controls individual units of the image forming apparatus 100 (i.e., the charging devices 2*a* to 2*d*, the developing devices 3*a* to 3*d*, the exposing device 5, the primary transfer rollers 6*a* to 6*d*, the cleaning devices 7*a* to 7*d*, the secondary transfer roller 9, the fixing unit 13, the developing voltage power supply 43, the current detection unit 44, the charging voltage power supply 45, the transfer voltage power supply 47, a voltage control unit 50, and the like). In other words, the main control unit (control unit) 80 controls the image forming units Pa to Pd, the primary transfer rollers (transfer members) 6*a* to 6*d*, and the image density sensor (density detection device) 40.

The voltage control unit 50 controls the developing voltage power supply 43 that applies the developing voltage to the developing roller 31, the charging voltage power supply 45 that applies the charging voltage to the charging roller 34, and the transfer voltage power supply 47 that applies the transfer voltages to the primary transfer rollers 6*a* to 6*d* and the secondary transfer roller 9, respectively. Note that the voltage control unit 50 may be constituted of the control program stored in the storage unit 70.

The main control unit 80 is connected to a liquid crystal display unit 90 and a transmitting and receiving unit 91. The liquid crystal display unit 90 functions as a touch panel for a user to perform various settings of the image forming apparatus 100, and displays status of the image forming apparatus 100, an image forming state, the number of printed sheets, and the like. The transmitting and receiving unit 91 performs external communication using a telephone line or the Internet line.

The main control unit 80 can execute the calibration mode separately from the normal image formation mode. In the image forming apparatus 100 of this embodiment, when the calibration mode is executed, the developing devices (3*a* to 3*d*) form the datum images (toner patches), and the developing voltage is adjusted on the basis of density of the datum image detected by the image density sensor (density detection device) 40. In addition, the transfer voltages to be applied to the primary transfer rollers (transfer members) 6*a* to 6*d* are adjusted on the basis of the adjusted developing voltage.

More specifically, by executing the calibration mode, a toner charge amount is estimated on the basis of the adjusted developing voltage, and the transfer voltages to be applied to the primary transfer rollers (transfer members) 6*a* to 6*d* are adjusted on the basis of the estimated toner charge amount. By adjusting and optimizing the transfer voltages (transfer currents supplied to the primary transfer rollers 6*a* to 6*d*) on the basis of the toner charge amount, it is possible to prevent defective transfer caused by insufficient transfer current with respect to the toner charge amount, and an image deficit such as reverse transfer or a white spot caused by excessive transfer current with respect to the toner charge amount. In this way, by executing the calibration mode, the density of the toner image can be corrected, and image quality of the toner image can be maintained.

Figure 4:
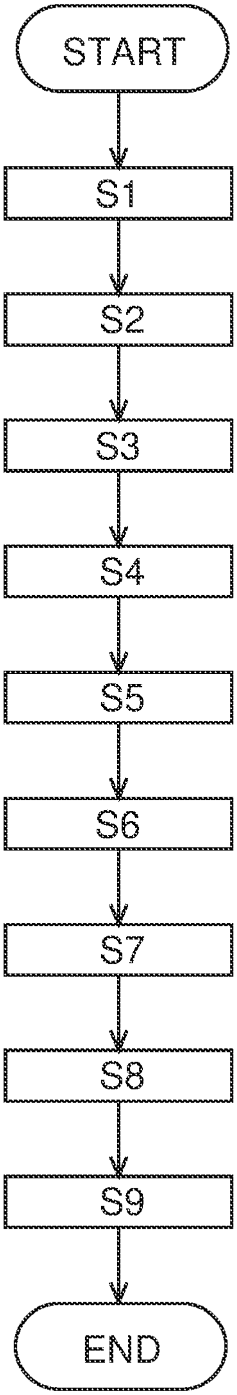
FIG. 4 is a flowchart illustrating an execution example of a calibration mode in the image forming apparatus 100 according to the embodiment of the present disclosure.

FIG. 4 is a flowchart illustrating an execution example of the calibration mode in the image forming apparatus 100. The main control unit (control unit) 80 can successively execute a plurality of types of the calibration modes. The calibration mode is executed, for example, when the accumulated number of printed sheets from the last execution of the calibration mode becomes a predetermined value (50 k to 100 k) or more. In this embodiment, the calibration mode for correcting solid density and the calibration mode for correcting half density are successively executed.

When the plurality of types of the calibration modes are successively executed, the calibration mode for correcting solid density is executed first. Specifically, when executing the calibration mode, in Step S1 the charging devices 2*a* to 2*d* charge the surfaces of the photosensitive drums 1*a* to 1*d*, respectively, and then the exposing device 5 exposes the surfaces of the photosensitive drums 1*a* to 1*d* so as to from electrostatic latent image patterns of the datum images. Further, the developing voltage power supply 43 applies the predetermined developing voltage to the developing roller 31 so as to develop the electrostatic latent image into the toner image. In this way, the toner images are formed on the photosensitive drums 1*a* to 1*d*.

In Step S2, the charging voltage power supply 45 applies the predetermined primary transfer voltages (transfer voltages) to the primary transfer rollers (transfer members) 6*a* to 6*d*, respectively, so as to transfer the toner images formed respectively on the photosensitive drums 1*a* to 1*d* onto the intermediate transfer belt (transfer target medium) 8. In this way, the datum images are formed on the intermediate transfer belt 8. The datum images are formed in cyan, magenta, yellow, and black colors, under the same image formation conditions (such as charging, exposing, and developing conditions) as in executing the image formation mode. In addition, the datum images are formed with solid density (image density of 100%).

Figure 5:
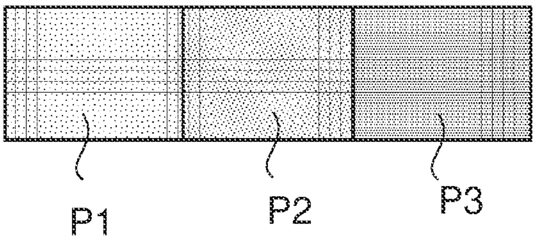
FIG. 5 is an explanatory diagram illustrating an example of datum images when the calibration mode is executed in the image forming apparatus 100 according to the embodiment of the present disclosure.

FIG. 5 is a diagram illustrating and example of the datum images in this embodiment. The datum images P1 to P3 are formed with solid density (image density of 100%) while the developing voltage is changed in a plurality of steps. For instance, the datum images P1 to P3 have the image density of 100%, and the developing voltages are 200 V, 300 V, and 400 V for the datum images P1, P2, and P3, respectively.

In Step S3, the image density sensor (density detection device) 40 detects density of the datum image on the intermediate transfer belt (transfer target medium) 8. In this embodiment, the main control unit 80 controls the image density sensor 40 to detect densities of the datum images P1 to P3 formed in Step S2.

In Step S4, the main control unit 80 adjusts the developing voltages on the basis of densities of the datum images detected by the image density sensor 40. In this embodiment, the developing voltage of one of the datum images P1 to P3, which is closest to solid density, is adjusted (set) as the developing voltage in normal printing (when executing the image formation mode). In this way, the density of the toner image can be adjusted so that an image containing solid density (a solid area) can be stably output with high quality.

Note that adjustment of the developing voltage is not limited to the method described above. For instance, the developing voltage may be adjusted by the following method. One sheet of the datum image is formed under predetermined image formation conditions, and density of the datum image is detected with the image density sensor (density detection device) 40. The detection result of the image density sensor 40 is compared with a reference density set under the predetermined image formation conditions. If the detected density of the datum image is higher than the reference density, the developing voltage in normal printing (when executing the image formation mode) is adjusted to be lower than a reference value. In this way, an electric field formed between the developing roller 31 and an image part of the electrostatic latent image is decreased. Therefore, toner amount used for development is decreased, and the density of the toner image is decreased.

On the other hand, if the detected density of the datum image is lower than the reference density, the developing voltage in normal printing (when executing the image formation mode) is adjusted to be higher than the reference value. In this way, the electric field formed between the developing roller 31 and an image part of the electrostatic latent image on the photosensitive drum 1*a* to 1*d* is increased. Therefore, toner amount used for development is increased, and the density of the toner image is increased.

In Step S5, on the basis of the developing voltage set (adjusted) in Step S4, the transfer voltages are adjusted, which are applied to the primary transfer rollers (transfer members) 6*a* to 6*d* in normal printing (when executing the image formation mode). Specifically, on the basis of a table stored in the storage unit 70 in advance, the transfer voltage corresponding to the developing voltage is set. For instance, if the developing voltage in normal printing (when executing the image formation mode) is adjusted to be lower than the reference value in Step S4, the transfer voltage in normal printing (when executing the image formation mode) is adjusted to be lower than a reference value. In this way, the transfer current supplied to the primary transfer roller (transfer member) 6*a* to 6*d* is adjusted to be smaller than a reference value.

On the other hand, if the developing voltage in normal printing (when executing the image formation mode) is adjusted to be higher than the reference value in Step S4, the transfer voltage in normal printing (when executing the image formation mode) is adjusted to be higher than the reference value. In this way, the transfer current supplied to the primary transfer roller (transfer member) 6*a* to 6*d* is adjusted to be larger than the reference value.

Note that if the developing voltage in normal printing (when executing the image formation mode) is not adjusted in Step S4, the transfer voltage in normal printing (when executing the image formation mode) is also not adjusted.

The developing voltage adjusted in Step S4 reflects the toner charge amount. For this reason, when the primary transfer voltage (transfer voltage) is adjusted on the basis of the adjusted developing voltage, the transfer voltage is accordingly adjusted on the basis of the toner charge amount. In this way, the transfer voltage can be adjusted and optimized on the basis of the toner charge amount. Therefore, it is possible to prevent defective transfer caused by insufficient transfer current with respect to the toner charge amount, and an image deficit such as reverse transfer or a white spot caused by excessive transfer current with respect to the toner charge amount. In this way, it is possible to provide the image forming apparatus 100 that can prevent occurrence of defective transfer with a simple structure.

Note that it is more preferred to adjust the transfer voltage on the basis of the developing voltage adjusted in Step S4 and moisture amount in the outside air. The moisture amount in the outside air can be detected, for example, using an environment sensor that detects both inside temperature and inside humidity. By adjusting the transfer voltage on the basis of the moisture amount in the outside air and the transfer voltage based on the toner charge amount, the transfer voltage to be adjusted can be more optimized. For instance, as the moisture amount in the outside air increases, adhesion of toner is also increased. In this case, the transfer voltage to be adjusted is further increased to be still higher than the reference value. In addition, as the moisture amount in the outside air decreases, adhesion of toner is also decreased. In this case, the transfer voltage to be adjusted is further decreased to be still lower than the reference value.

In Step S6, after the charging devices 2*a* to 2*d* charge the surfaces of the photosensitive drums 1*a* to 1*d*, respectively, the exposing device 5 exposes the surfaces of the photosensitive drums 1*a* to 1*d* so as to form the electrostatic latent image patterns of the datum images. Then, the developing voltage power supply 43 applies the developing voltage adjusted in Step S4 to the developing roller 31, so as to develop the electrostatic latent image into the toner image. In this way, the toner images are formed on the photosensitive drums 1*a* to 1*d*.

In Step S7, the charging voltage power supply 45 applies the primary transfer rollers (transfer members) 6*a* to 6*d* respectively with the primary transfer voltages (transfer voltages) adjusted in Step S5, so as to transfer the toner images formed respectively on the photosensitive drums 1*a* to 1*d* onto the intermediate transfer belt (transfer target medium) 8. In this way, the datum images are formed on the intermediate transfer belt 8. The datum images are formed in cyan, magenta, yellow, and black colors, respectively, under the same image formation conditions (such as charging, exposing, and developing conditions) as in executing the image formation mode. In addition, the datum images are formed with half density (e.g., an image density of 50%).

In Step S8, the image density sensor (density detection device) 40 detects densities of the datum images on the intermediate transfer belt (transfer target medium) 8.

In Step S9, the main control unit 80 changes the image formation conditions except for the developing voltage and the transfer current, on the basis of densities of the datum images detected by the image density sensor 40. In this way, the density of the toner image is corrected, and an image containing half density (half tone density) can be stably output with high quality.

In other words, the main control unit (80) can successively execute a plurality of types of the calibration modes. When executing the calibration mode first time (Steps S1 to S6), the developing devices 3*a* to 3*d* form the datum images of solid density, and on the basis of the density of the datum image of solid density detected by the image density sensor (density detection device), the developing voltage is adjusted, and then the transfer voltage is adjusted on the basis of the adjusted developing voltage.

In this way, when a plurality of types of the calibration is successively executed, consumption of toner can be reduced, and calibration time can be shortened.

Note that in this embodiment, the calibration mode for correcting solid density and the calibration mode for correcting half density are successively executed, but as long as the calibration mode for correcting solid density is executed first, a type of the calibration that is executed afterward is not limited. For instance, it is possible to execute an I/O calibration, in which an inclination of color density (a y table) in an actual image output is set by calculation processing so as to perform correction.

Other than that, the present disclosure is not limited to the embodiment described above, but can be variously modified within the scope of the present disclosure without deviating from the spirit thereof. For instance, in the embodiment described above, the transfer voltage is adjusted on the basis of the adjusted developing voltage and moisture amount in the outside air, but it may be adjusted on the basis of temperature of the outside air.

In addition, in the embodiment described above, the color printer illustrated in FIG. 1 is exemplified as the image forming apparatus 100, but it may be any other image forming apparatus such as a monochrome or color copier, a digital multifunction peripheral, or a facsimile machine, without limiting to the color printer.

The present disclosure can be applied to an image forming apparatus that uses two-component developer containing toner and carrier.

What is claimed is:

1. An image forming apparatus comprising:

an image forming unit including an image carrier having a photosensitive layer formed on a surface thereof, a charging device that charges the image carrier, an exposing device that exposes the image carrier charged by the charging device, so as to form an electrostatic latent image, and a developing device that has a developer carrier disposed to face the image carrier and carry two-component developer containing magnetic carrier and toner, and applies the developer carrier with a predetermined developing voltage, so as to allow the toner to adhere to the electrostatic latent image formed on the image carrier to form a toner image;

a transfer member that is disposed to face the image carrier, and is applied with a predetermined transfer voltage so as to transfer the toner image formed on the image carrier onto a transfer target medium;

a density detection device that detects density of the toner image transferred onto the transfer target medium; and a control unit that controls the image forming unit, the transfer member, and the density detection device, wherein the control unit is capable of executing a calibration mode to maintain image quality of the toner image, and when the calibration mode is executed, a datum image is formed by the developing device, the developing voltage is adjusted on the basis of density of the datum image detected by the density detection device, and the transfer voltage is adjusted on the basis of the adjusted developing voltage.

2. The image forming apparatus according to claim 1, wherein the control unit is capable of successively executing a plurality of types of the calibration modes, and when the calibration mode is executed first time, the datum image of solid density is formed by the developing device, the developing voltage is adjusted on the basis of density of the datum image of solid density detected by the density detection device, and the transfer voltage is adjusted on the basis of the adjusted developing voltage.

3. The image forming apparatus according to claim 1, wherein the transfer voltage is adjusted on the basis of the adjusted developing voltage and moisture amount in outside air.

* * * * *